United States Patent [19]

Abel

[11] 4,453,668
[45] Jun. 12, 1984

[54] FAIL-SAFE THERMOSTATIC VALVE

[75] Inventor: Martin L. Abel, Franklin, Mich.

[73] Assignee: Caltherm Corporation, Columbus, Ind.

[21] Appl. No.: 440,530

[22] Filed: Nov. 10, 1982

[51] Int. Cl.³ ............................................. F01P 7/02
[52] U.S. Cl. .................................. 236/34.5; 236/100; 236/DIG. 2
[58] Field of Search .................. 236/34, 34.5, 100, 90, 236/DIG. 2

[56] References Cited

U.S. PATENT DOCUMENTS

| | | | |
|---|---|---|---|
| 2,830,767 | 4/1958 | Herbenar | 236/93 A X |
| 2,842,317 | 7/1958 | Wood | 236/DIG. 2 |
| 3,045,918 | 7/1962 | Woods | 236/34 |
| 3,128,043 | 4/1964 | Feinberg | 236/DIG. 2 |
| 3,498,537 | 3/1970 | Wong . | |
| 3,776,457 | 12/1973 | Cardi . | |
| 4,245,782 | 1/1981 | Brown | 236/34.5 |
| 4,361,167 | 11/1982 | Harasewych | 236/48 R X |

Primary Examiner—William E. Tapolcai
Attorney, Agent, or Firm—Lane, Aitken & Kananen

[57] ABSTRACT

A fail-safe thermostatically operated valve includes a temperature-responsive actuator for moving a valve element between a retracted position and an extended position. The valve includes a first cylindrical member and a second cylindrical member which are releasably connected to one another by a temperature-responsive release device which is responsive to a second predetermined temperature above the normal operating temperature of the valve. A spring arrangement provides return capability for the valve element and overtravel capability for the valve in the normal temperature operating range, and biasing force to move the valve element from the retracted to the extended position when the temperature-responsive release device operates. In one embodiment, the temperature-responsive release device includes a miniature wax-filled actuator in engagement with a mechanical linkage. In an alternate embodiment, the temperature-responsive release device comprises a heat fusible material.

8 Claims, 6 Drawing Figures

FAIL-SAFE THERMOSTATIC VALVE

BACKGROUND OF THE INVENTION

Thermostatically operated valves are used in vehicle engines in which they move between an unactuated position and an actuated position to control the flow of a fluid such as water or oil through a cooler, for example, a radiator, in response to the temperature of the fluid. These valves have been known to fail, so that they remain in their unactuated positions. The failure of such valves in such a position has resulted in significant overheating of the water or oil and severe damage to the engine.

In response to the problem of thermostatic valve failure, fail-safe devices have been designed which include safety provisions in case the valve fails to operate in its principal mode as intended. For example, U.S. Pat. No. 3,045,918 to Woods discloses an actuator in which a valve element is biased to the closed position by a spring in tension. Furthermore, one embodiment of the actuator is disclosed in which a predetermined temperature above the range of normal operating temperatures of the valve causes the softening of material which anchors the spring to the valve element, thereby allowing the valve element to fall away from the valve seat. U.S. Pat. No. 3,498,537 to Wong discloses a fail-safe thermostatic valve which is mounted in a flow path by means of an annular connector member of fusible material which melts or softens at a temperature above the normal operating temperature, so that the pressure of the fluid moves the valve out of its mounting and permits the flow of fluid around the valve. U.S. Pat. No. 3,776,457 to Cardi discloses a thermostatic valve mounted in parallel with a heat softenable plug, so that if the valve fails to open, the plug will soften and open in response to a temperature above the temperature for which the thermostatic valve is designed, whereby a flow of the controlled fluid bypasses the valve.

Although the foregoing prior devices disclose the concept of fail-safe arrangements, the Cardi device, for example, requires a thin-wall support structure in order to mount the plug in parallel with the valve. In addition, none of the devices mentioned includes a mechanism for positively clearing an opening through which the fluid can flow when the valve operates in the fail-safe mode.

SUMMARY OF THE INVENTION

It is, therefore, an object of the present invention to provide a reliable thermostatically operated valve which operates positively to control the flow of fluid through the valve in the event of failure of the valve.

It is another object of the present invention to provide a fail-safe thermostatically operated valve which includes a spring arrangement for biasing the valve to the closed position in the event of failure of the valve and for providing overtravel accommodation for the valve during normal operation.

In order to fulfill these and other objects, the thermostatic valve according to the present invention comprises a first cylindrical member disposed within a releasably secured to a second cylindrical member, and an actuator in the form of a temperature-responsive wax-filled element supported by the first cylindrical member. The actuator includes a piston and a guide member, the guide member supporting a snap ring on which is mounted a return spring concentric with the actuator. The return spring is connected through a spring locator to a cylindrical valve element having an open end and a closed end adapted to engage a valve seat when the temperature of the controlled fluid attains a first predetermined value. At this temperature, the fluid heats the wax in the actuator and causes the piston to extend. Additional heating of the wax causes additional relative movement between the piston and the guide member in the form of overtravel, which is accommodated by an overtravel spring mounted between an annular projection on the actuator and a top portion of the valve in order to bias the actuator toward the valve seat. The first cylindrical member is releasably secured to the second cylindrical member by a temperature-responsive release device which is responsive to a second predetermined temperature above the normal operating range of the valve to release the first member from the second member, thereby permitting the overtravel spring to bias the first cylindrical member and the cylindrical valve element which is supported thereby toward the valve seat so that the valve element engages the valve seat and prevents flow therethrough.

In one embodiment, the temperature-responsive release device includes an auxiliary actuator in the form of a wax-filled element, responsive to the second predetermined temperature for producing a positive-movement. The auxiliary actuator engages a releasable mechanical linkage between the first cylindrical member and the second cylindrical member, whereby the auxiliary actuator responds to the second predetermined temperature to release the connection between the first and second cylindrical members. The release permits the overtravel spring to bias the first cylindrical member and the valve element carried thereby toward the valve seat so that the valve element engages the valve seat and prevents flow therethrough. In this embodiment of the invention, the thermostatically operated valve is reusable since, when it cools, the actuator can be returned to its unactuated position and the mechanical linkage can be returned to its initial position connecting the first and second cylindrical members and preventing relative movement therebetween.

In an alternate embodiment according to the present invention, a heat fusible material can be used to connect the first and second cylindrical members and prevent relative movement therebetween. Thus, when the temperature of the controlled fluid reaches the second predetermined temperature which is above the normal operating range of the valve, the material fuses so that the first cylindrical member is biased by the overtravel spring toward the valve seat.

DETAILED DESCRIPTION OF THE PREFERRED EMBODIMENTS

Figure 1:
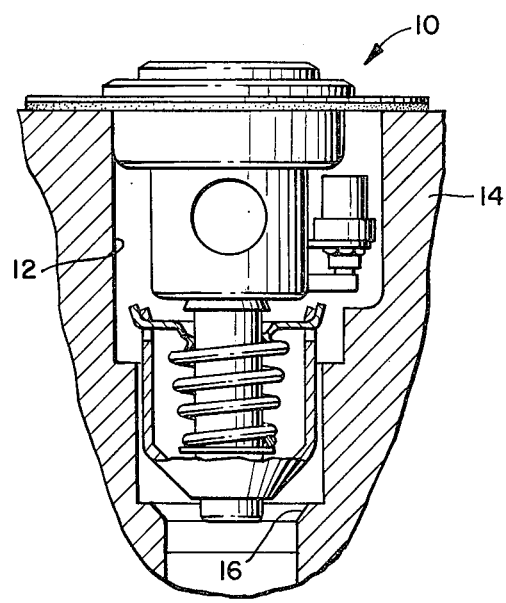
FIG. 1 is a cross section of an engine block showing a fail-safe thermostatically operated valve according to the present invention mounted therein.

As is illustrated in FIG. 1, the fail-safe thermostatically operated valve according to the present invention, which is generally designated by the reference numeral 10, is positioned in a cavity 12 in an engine block 14 to control the flow of a fluid such as oil or water in response to the temperature of the fluid. A valve seat 16 is defined in the lower portion of the cavity 12 so that it may be engaged by the valve 10 to prevent flow through the valve seat.

Figure 2:
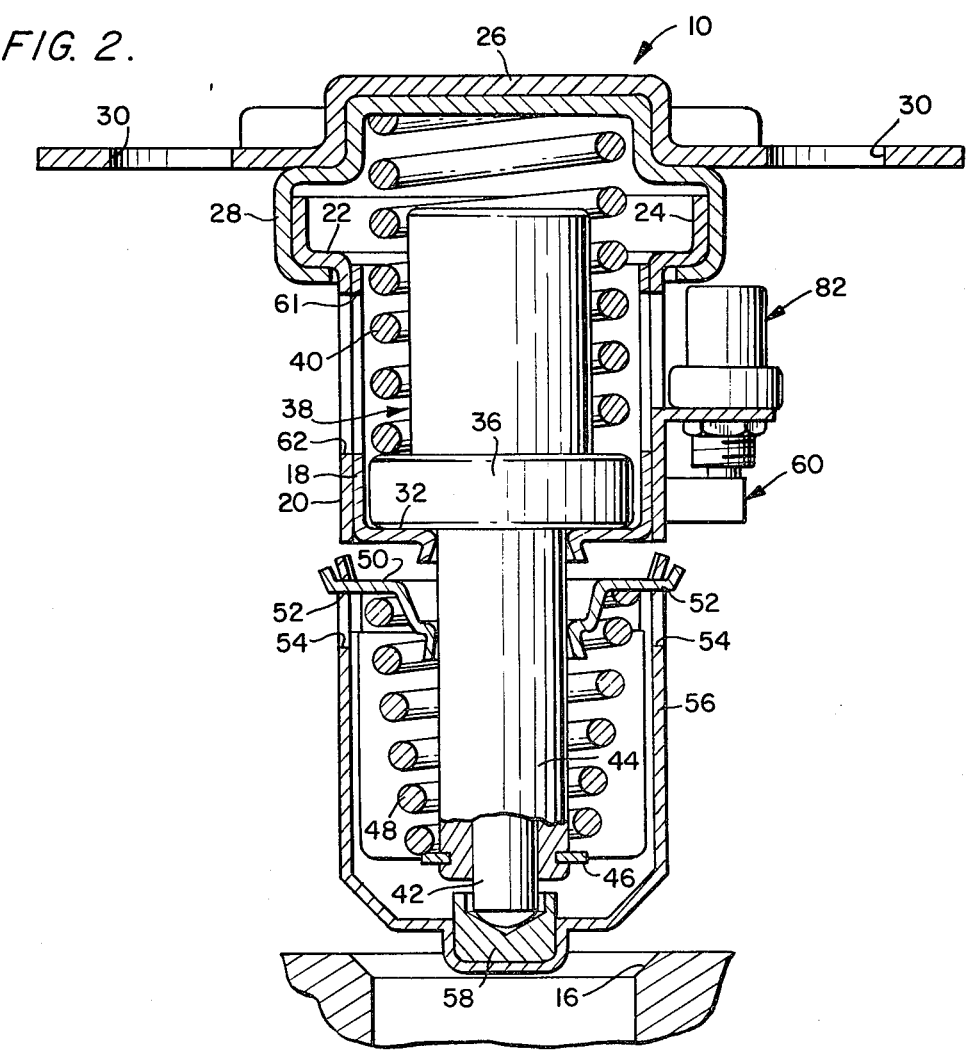
FIG. 2 is a cross section of the valve of FIG. 1.

As can best be seen from FIG. 2, the valve 10 comprises a first, inner cylindrical member 18 and a second, outer cylindrical element 20 concentric with the inner cylindrical element 18 and in contact with an outer surface thereof. The outer cylindrical member 20 includes at one end a radially extending shoulder 22 and an annular upstanding flange 24 projecting from the shoulder 22. The outer cylindrical member 20 is connected to a supporting cap 26, which supports the valve 10 in the engine cavity 12 through a cup member 28 which is secured to the cap 26 and turned-in under the shoulder 22 to support the outer cylindrical member 20. The cap 26 includes a plurality of apertures 30 for receiving cap screws or other suitable fastening devices to hold the cap 26 and the valve 10 in place in the cavity 12.

The inner cylindrical member 18 includes an inwardly extending annular flange 32 for carrying a lower surface of an annular projection 36 on a wax-filled temperature-responsive actuator generally designated by the numeral 38. An opposite surface of the annular projection 36 is engaged by an overtravel spring 40 which is concentric with the actuator 38 and is under tension between the annular projection 36 and the cup 28 to bias the actuator 38 and the inner cylindrical member 18 toward the valve seat 16.

The actuator 38 is a conventional device which includes, besides the annular projection 36, a filling of wax, which when heated melts and expands, forcing a piston 42 to an extended position. The piston 42 moves within a guide 44 which includes at its lower end a grove for receiving a snap ring 46 on which is mounted a coiled return spring 48. The return spring 48 extends upwardly from the snap ring 46 and engages the underside of a generally disc-shaped spring locator 50 which includes a plurality of circumferentially spaced, radially extending tabs 52. The tabs 52 extend through apertures 54 defined in the annular wall of a cup-shaped valve element 56, the end wall of which is engaged by the piston 42 of the actuator 38 acting through a reinforcing button 58. Thus, the return spring 48, the spring locator 50 and the valve element 56 are all carried by the actuator 38, which is in turn carried by the inner cylindrical member 18.

Figure 3:
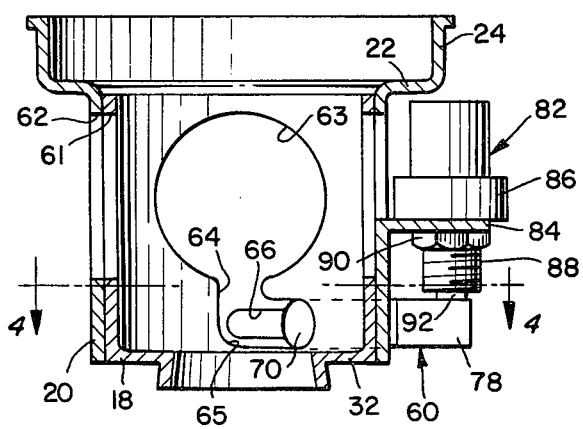
FIG. 3 is a cross section of the first and second cylindrical members of the valve of FIG. 2, along with a release device.
Figure 4:
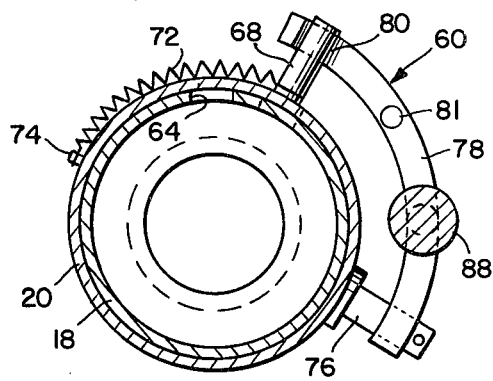
FIG. 4 is a cross section taken along the line 4-4 in FIG. 3.
Figure 5:
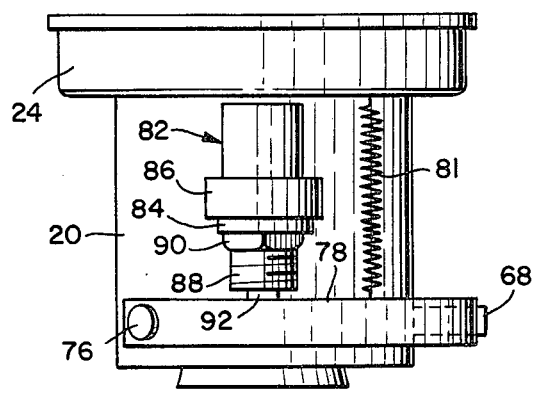
FIG. 5 is a right side view of the first and second cylindrical members and release device of FIG. 3.

During normal operation, the inner cylindrical member 18 is secured to the outer cylindrical member 20 so that the cylindrical members 18 and 20 move with one another and are prevented from moving relative to one another. In the embodiment illustrated in FIG. 2, the inner and outer cylindrical members 18 and 20 are releasably secured to one another by a mechanical linkage generally designated by the reference numeral 60 and better illustrated in FIGS. 3-5. The inner cylindrical member 18 includes a plurality of apertures 61 and the outer cylindrical member 20 includes a plurality of apertures 62 substantially in alignment with the apertures 61, enabling the controlled fluid to flow into contact with the actuator 38, so that the actuator 38 can sense the heat of the fluid. An additional aperture 63 defined in the inner cylindrical member 18 includes a neck portion 64 and a circumferentially extending slot 65. The outer cylindrical member 20 includes a circumferentially extending slot 66 generally in alignment with the slot 65 and having a portion which is in alignment with the neck portion 64. A pin 68 (FIGS. 4 and 5) having a head 70 extends through the slots 65 and 66 and projects radially outwardly therefrom, with the head 70 being positioned in the slot 66 and in engagement with the inner surface of the outer cylindrical member 20. Thus, it can be seen that the pin 68 prevents relative axial movement between the inner cylindrical member 18 and the outer cylindrical member 20. A coil spring 72 is connected to the pin 68 and extends circumferentially around the outer surface of the outer cylindrical member 20 to an anchoring peg 74 secured to the outer surface of the outer cylindrical member 20. A pivot pin 76 is mounted in the outer cylindrical member 20 from which it projects radially for pivotally receiving an arcuate lever member 78 which extends back to the pin 68 and includes a hook portion 80 for engaging the pin 68 and maintaining it in a position in the slot 66 which lies below a solid portion of the inner cylindrical member 18 so that relative axial movement between the inner cylindrical member 18 and the outer cylindrical member 20 is prevented. The hook portion 80 underlies the pin 68, and the arcuate lever 78 is biased upwardly by a spring 81 connected at one end to the arcuate lever between the pivot pin 76 and the hook portion 80 and at the other end to the shoulder 22.

A fail-safe temperature-responsive release device, which is responsive to a predetermined temperature above the normal operating range of the valve 10, can take the form of a miniature, auxiliary actuator 82, such as a wax-filled element, for producing a positive movement in response to the temperature. The actuator 82 is mounted on a tab 84 projecting radially outward from the outer cylindrical member 20. The tab 84 can be struck out from the wall of the outer cylindrical member 20, or other suitable mounting arrangements can be provided. The auxiliary actuator 82 includes a projection 86 and an externally threaded guide 88 for receiving a nut 90 to secure the auxiliary actuator 82 to the tab 84. A piston 92 is mounted for reciprocation within the threaded guide 88, and engages the top of the arcuate lever 78 so that it can move the lever 78 downward against the bias of the spring 82 to disengage the hook portion 80 from the pin 68.

In the normal operation of the valve 10, the temperature-responsive actuator 38 senses the temperature of the liquid in which the valve 10 is mounted, since the liquid flows into contact with the actuator 38 through the apertures 61 and 62 in the inner cylindrical member 18 and the outer cylindrical member 20, respectively. When the temperature of the liquid exceeds a first predetermined value, the wax in the actuator 38 melts and expands, thereby forcing the piston 42 from its unactuated, retracted position to its actuated, extended position. The extension of the piston 42 acts through the button 58 to move the valve element 56 into engagement with the seat 16, and, at the same time, compresses the return spring 48 between the spring locator 50 and the snap ring 46. If slightly greater temperatures than the predetermined temperature occur, the wax expands farther and the piston 42 extends farther from the guide 44. However, since the valve element 56 has already engaged the valve seat 16, the piston 42 can move no farther toward the valve seat 16. Instead, the overtravel of the actuator is accommodated by the movement of the actuator 38 upward within the inner cylindrical member 18 against the bias of the overtravel spring 40. When the excess temperature dissipates, the overtravel spring 40 moves the actuator 38 back toward the valve seat 16 until the annular projection 36 engages the flange 32 on the inner cylindrical member 18. When the temperature of the liquid falls below the predetermined value, the wax cools and contracts, and the return spring 48 expands, thereby causing the valve element 56 to push the piston 42 to its retracted position.

If the valve should fail to function, so that it remains in its unactuated, retracted position despite the rise of the temperature of the fluid above the first predetermined value, the temperature of the fluid can continue to rise. If the temperature of the fluid rises above a second predetermined value, which is higher than the first predetermined value, and which is at the threshold of temperatures which are likely to be severely damaging to the engine, the wax in the auxiliary actuator 82 melts and the piston 92 extends. This extension moves the arcuate lever 78 downward so that the hook portion 80 is clear of the pin 68. The coil spring 72 then pulls the pin 68 circumferentially through the slots 65 and 66 until the pin 68 lies below the neck portion 64 of the additional aperture 63 in the inner cylindrical member 18. In this position, the pin 68 no longer prevents relative axial movement between the inner cylindrical member 18 downward with respect to the outer cylindrical member 20, so that the overtravel spring 40 moves the inner cylindrical member 18 downward with respect to the outer cylindrical member 20 and thereby moves the valve element 56 into engagement with the valve seat 16. Thus, a fail-safe mechanism is provided for the valve 10 to prevent damage to the engine. In this embodiment of the invention, if the reason for valve failure can be determined and corrected, the mechanical linkage 60 can be reset and the valve 10 reused.

Figure 6:
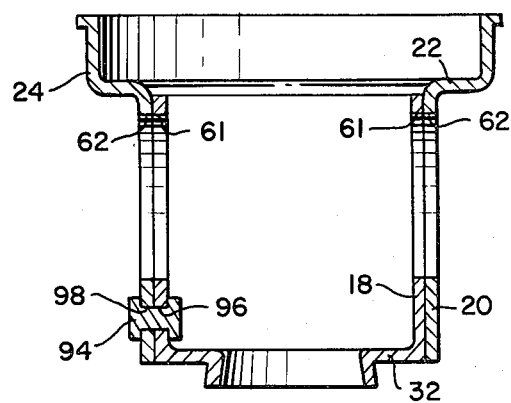
FIG. 6 is a cross sectional view of an alternate embodiment of the first and second cylindrical members, which are attached to one another by a pin of heat fusible material.

In an alternate embodiment of the invention, which can be seen from FIG. 6, the auxiliary actuator 82 and the linkage 60 are replaced by a fail-safe temperature-responsive release device in the form of a pin or rivet 94 or other element of heat softenable or heat fusible material. The pin 94 can be pushed through aligned openings 96 and 98 defined in the inner cylindrical member 18 and the outer cylindrical member 20, respectively, until the end of the pin 94 projects from the other side, whereupon it is flattened to secure the pin in the openings and to secure the inner cylindrical member 18 to the outer cylindrical member 20 to prevent relative axial movement therebetween.

When the temperature of the surrounding fluid exceeds the second, higher predetermined value, the pin 94 fuses or softens, so that the inner cylindrical member 18 is free to move axially with respect to the outer cylindrical member 20 under the bias of the overtravel spring 40, thereby allowing the valve element 56 to engage the valve seat 16. Although in the embodiment shown, the heat fusible or softenable material takes the form of a pin or rivet 94, it is understood that the inner cylindrical member 18 could be secured to the outer cylindrical member 20 by an annular bead of the heat fusible or softenable material or that one or more tack welds of such material can be provided between the inner cylindrical member 18 and the outer cylindrical member 20. Moreover, other configurations of the heat fusible or softenable material may be employed.

Although it is apparent from the foregoing that the embodiments of the present invention disclosed herein provides significant advantages, it is understood that various changes and modifications may be made without departing from the spirit and scope of the present invention as recited in the appended claims and their legal equivalents. For example, the valve element 56 can be provided with a configuration, whereby it engages a valve seat when it is in its retracted position and opens to permit flow through the seat when it is in its extended position.

What is claimed is:

1. A temperature-responsive valve for moving between an open position and a closed position comprising:
   a valve element movable between a first position in which the valve element is spaced from a valve seat and a second position in which the valve element engages the valve seat;
   a main actuator in engagement with the valve element and responsive to a first predetermined temperature for moving the valve element between the first position and the second position; and
   fail-safe means responsive to a second predetermined temperature higher than the first predetermined temperature for moving the valve element between the first position and the second position, said fail-safe means comprising means for producing a positive movement in response to said second predetermined temperature and including a wax-filled element actuator responsive to said second predetermined temperature.

2. The valve of claim 1 wherein the first mentioned actuator moves the valve element from the first position to the second position.

3. The valve of claim 1, further comprising means for supporting the valve element adjacent to the valve seat, the supporting means including a first member supporting the valve element and a second member supporting the first member, and the fail-safe means comprises means releasably securing the first member to the second member.

4. The valve of claim 3 wherein the first and second members are each cylindrical and are concentric with respect to one another.

5. The valve of claim 3 further comprising means for biasing the first member in the direction in which the main actuator is adapted to move the valve element.

6. The valve of claim 3 wherein the releasable securing means comprises a mechanical linkage and the wax-filled actuator is in engagement with the mechanical linkage.

7. The valve of claim 5 further comprising means connecting the valve element to the main actuator, the main actuator being supported by the first member, wherein the biasing means comprises a spring engaging the actuator and forcing the actuator into engagement with the first member, whereby the spring biases the first member in said direction.

8. The valve of claim 1 wherein the main actuator is a wax-filled element.

* * * * *